(No Model.)
E. B. SINTZENICH.
THRUST BEARING.
No. 504,253. Patented Aug. 29, 1893.
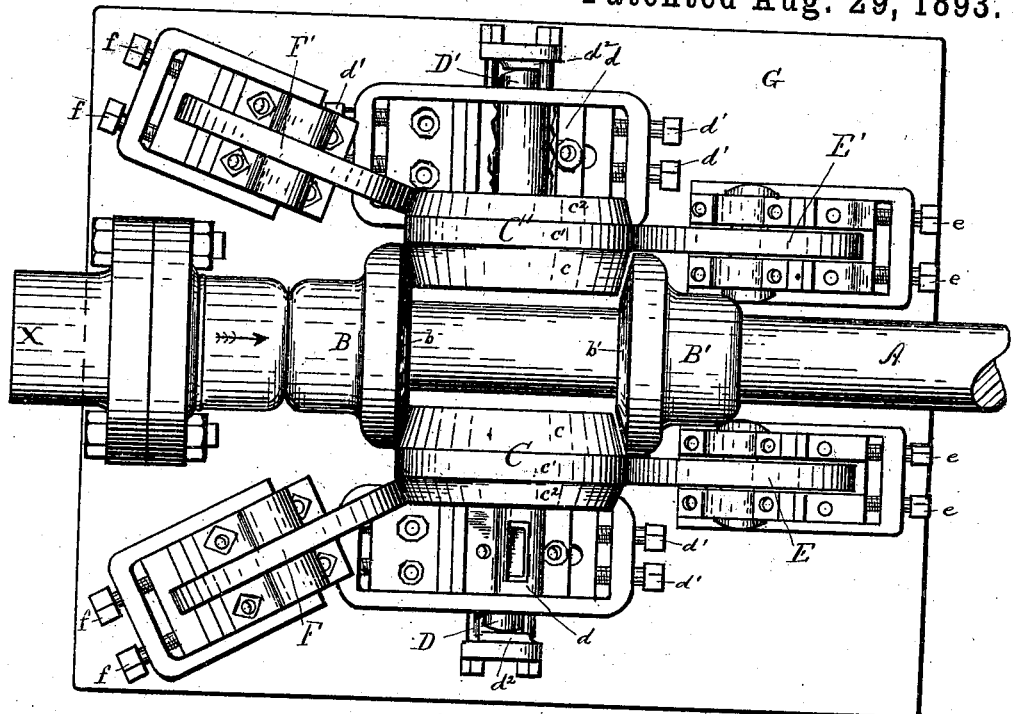
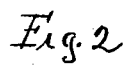
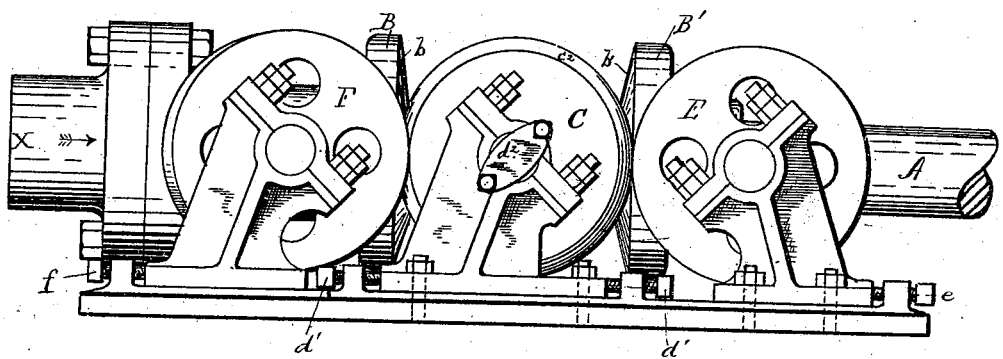
WITNESSES:
H. E. Bates.
M. W. McRoden
INVENTOR,
Edwin B. Sintzenich
BY Howard L. Osgood
ATTORNEY.

UNITED STATES PATENT OFFICE.

EDWIN B. SINTZENICH, OF ROCHESTER, NEW YORK.

THRUST-BEARING.

SPECIFICATION forming part of Letters Patent No. 504,253, dated August 29, 1893.

Application filed December 19, 1892. Serial No. 455,732. (No model.)

*To all whom it may concern:*

Be it known that I, EDWIN B. SINTZENICH, a citizen of the United States, and a resident of the city of Rochester, in the county of Monroe and State of New York, have invented certain new and useful Improvements in Thrust-Bearings, of which the following is a specification, reference being had to the accompanying drawings, in which—

Figure 1 is a plan view of my thrust bearing, and Fig. 2 is a side elevation thereof.

My invention consists in the improvements in thrust bearings hereinafter described and claimed, and the object thereof is to provide an anti-friction thrust bearing for propeller shafts of steam ships and for other purposes.

Referring to the drawings, A is the driven shaft; B B' are collars rigidly fixed thereupon, having the inclined bearing faces $b\,b'$; C C' are anti-friction rollers set upon shafts D D', which are in a line at right angles to the line of the shaft A. The shafts D D' are set in movable journal boxes $d\,d$, which are adjustable, in lines parallel with the shaft A, by suitable means such as the set screws $d'\,d'$. The end of each shaft D D' rests against a suitable step $d^2$. The rollers C C' have each a beveled face $c$ of an angle complementary to the angle of the faces $b\,b'$, of the collars B B'. The collars B B' form conical rollers which roll on the conical rollers C C'. The rollers C C' have each another face $c'$ which is flat. Two anti-friction rollers E E' on shafts, set in adjustable journal boxes, may be adjusted to and from the rollers C C' as by the set screws $e\,e$ and have flat faces which bear against the flat faces $c'\,c'$. The rollers C C' have beveled faces $c^2$ which are substantially of the same angle as the faces $c\,c$, but are inclined in the opposite direction. Friction rollers F F' having flat faces, are set at right angles to the faces $c^2\,c^2$, in suitable bearings and adjustable to and from the faces $c^2\,c^2$ by set screws $f\,f$.

In a steam ship, as the shaft revolves, a longitudinal pressure in the shaft is produced by the pressure of the propeller against the water. The propeller is fixed on the end of the shaft extended from the coupling marked X, and the pressure will be in the direction of the arrow. This causes the collar B to press against the beveled faces $c\,c$ of the rollers C C', which causes the flat faces $c'\,c'$ to press against the rollers E E'. The collar B' is so set on the shaft that it will be out of contact with the faces $c\,c$, but near the same as shown in Fig. 1. The revolution of the shaft will cause the rollers C C' to revolve, which will cause the rollers E E' to revolve and the friction of the rolling surfaces being far less than the original rubbing friction in journals, will much reduce the power required, in order to turn the shaft A. In order that the bearing may be of service when the propeller is reversed the shaft A is allowed to have enough longitudinal movement in its bearings, so that when pressure is in the opposite direction to the arrow, the collar B' will press against the rollers C C'. The rollers E E' then become ineffective, but the pressure is taken up by the rollers F F'. A heavy pressure between the collar B and the rollers C C' will cause more or less wearing of the surfaces in contact. The friction rollers F F' will enable all such wear to be taken up, and in addition, will prevent the pressure on the steps $d^2\,d^2$ and the spreading of the rollers C C', on account of the wedge action of the rollers E upon the beveled surfaces $c\,c$. The rollers F F' may be on the same side of the rollers C C' as the rollers E E'. I thus produce an anti-friction bearing for the most powerful machines, and not only produce the desired effect of reducing friction, but also provide means for taking up the wear in the device, which holds the parts together against the strains which are necessarily produced.

The various rollers above described, are journaled in boxes set on a bed plate G. Where the shaft is horizontal, suitable bearings are provided to support the shaft, as the devices herein described can not support it; where the shaft is vertical, one of the collars B' is removed and the shaft will be supported by the collar B. For vertical shafts, three (3) or more rollers like C and C' with corresponding rollers E and F may be employed.

What I claim is—

1. In a thrust bearing the combination of a shaft, a collar fixed on said shaft and having an inclined face, rollers having each an axis at right angles to said shaft and a beveled face against which the collar bears, a flat face, and a second beveled face and rollers having flat faces and bearing respectively against said last mentioned beveled faces, substantially as and for the purposes described.

2. In a thrust bearing the combination of a shaft A, a collar B fixed on said shaft and having an inclined face $b$, rollers as C having each an axis at right angles to said shaft, and a beveled face $c$, against which the collar bears, a flat face $c'$ and a second beveled face $c^2$, a roller E bearing against said flat face $c'$ and having an axis at right angles to said shaft and a roller F bearing against said beveled face $c^2$ and having an axis parallel to said face, substantially as and for the purposes described.

3. In a thrust bearing, the combination of a shaft, having a slight longitudinal movement, collars oppositely fixed on said shaft, and having inclined faces respectively, rollers having axes at right angles to said shaft and each having a beveled face adapted to bear against the inclined faces of said collars and a flat face, said collars being so set on said shaft that when the shaft is moved in one direction, one of said collars bears against said rollers, and when the shaft is moved in the other direction, the other collar bears against said rollers, and rollers having axes at right angles to said shaft and bearing against said flat faces, substantially as described.

EDWIN B. SINTZENICH.

Witnesses:
S. P. MOORE,
H. L. OSGOOD.